United States Patent
Tan et al.

(10) Patent No.: US 10,885,621 B2
(45) Date of Patent: Jan. 5, 2021

(54) CONTACT LENS INSPECTION IN A PLASTIC SHELL

(71) Applicant: EMAGE VISION PTE. LTD., Singapore (SG)

(72) Inventors: Bee Chuan Tan, Singapore (SG); Chern Fei Chua, Singapore (SG)

(73) Assignee: EMAGE VISION PTE. LTD., Singapore (SG)

( * ) Notice: Subject to any disclaimer, the term of this patent is extended or adjusted under 35 U.S.C. 154(b) by 309 days.

(21) Appl. No.: 15/894,610

(22) Filed: Feb. 12, 2018

(65) Prior Publication Data
US 2018/0232876 A1 Aug. 16, 2018

(30) Foreign Application Priority Data
Feb. 10, 2017 (SG) .......................... 10201701099X (51) Int. Cl.
*G06T 7/00* (2017.01)
*G02C 7/04* (2006.01)

(52) U.S. Cl.
CPC .............. *G06T 7/0004* (2013.01); *G02C 7/04* (2013.01); *G06T 2207/10152* (2013.01); *G06T 2207/30108* (2013.01); *G06T 2207/30242* (2013.01)

(58) Field of Classification Search
CPC ......... G06T 7/0004; G06T 2207/10152; G06T 2207/30108; G06T 2207/30242; G02C 7/04; G01M 11/08; G01N 21/64; G01N 21/958; H04N 5/225; G06K 9/62; G01B 9/00
See application file for complete search history.

(56) References Cited

U.S. PATENT DOCUMENTS

| | | | | |
|---|---|---|---|---|
| 5,574,554 | A * | 11/1996 | Su ...................... | B29C 33/0055 356/124 |
| 2003/0141458 | A1* | 7/2003 | Ross, III ............ | G01N 21/9508 250/458.1 |
| 2009/0037139 | A1* | 2/2009 | Rust ..................... | G01B 11/024 702/158 |
| 2012/0287198 | A1* | 11/2012 | Barss ................... | B41J 2/07 347/19 |
| 2017/0011507 | A1* | 1/2017 | Wong .................. | H04N 5/247 |
| 2017/0324895 | A1* | 11/2017 | Bryll ................... | H04N 5/2353 |

* cited by examiner

*Primary Examiner* — Jamil Ahmed
(74) *Attorney, Agent, or Firm* — Mannava & Kang, P.C.

(57) ABSTRACT

An inspection system and method to detect the presence or absence of ophthalmic lenses in a plastic shell just before the seal is applied comprising a high resolution imaging device suitably integrated with an optical module; a UV illumination module suitably mounted below the ophthalmic lens holder; a Visible LED based Top lighting module suitably mounted on Top of the Ophthalmic lens holder; the inspection system which captures images of the lens immersed in a saline solution in a the plastic shell; analyzing the image and determining the characteristics of the lens perimeter and the optical center; making a decision to reject the inspected item if the analyzed image indicates the presence of a flipped, multiple and folded lens or the absence of the lens; making a decision to accept the inspected item, if the analyzed image indicates the presence of a single lens positioned in the correct orientation.

18 Claims, 7 Drawing Sheets

CONTACT LENS INSPECTION IN A PLASTIC SHELL

FIELD OF THE INVENTION

The present invention relates to an apparatus and method for detecting and inspecting Ophthalmic lenses suspended in saline solution contained in a plastic shell, using multiple illumination modules. More specifically, the present invention relates to an apparatus and method to detect for absence, presence, flipped, folded and presence of multiple Ophthalmic lens and number of lenses, within a translucent or transparent plastic shell, just before the sealing process.

BACKGROUND OF THE INVENTION

The present invention relates to an inspection system in an automated production line. More particularly, the invention relates to a system and method of inspection of ophthalmic lens immersed in Saline solution in a plastic shell. The plastic shell is presented to the inspection station that is configured with a multiple illumination modules. Some types of plastic shells are translucent and others are transparent. The diffusion characteristics plastic shells made of translucent material are different from plastic shells made from transparent material. Owing to this difference, the captured image of ophthalmic lenses can vary significantly and pose problems in reliably detecting the absence, presence, flipped, folded and presence of multiple Ophthalmic lenses within the plastic shell.

Such systems suffer from certain inherent limitations especially when attempting to enhance edge of the lens. Inspection systems using LED illumination generally perform well by enhancing the edge of the lens suspended in the Saline solution when the plastic shell is transparent. Several experiments have shown that in spite of inspecting the lenses suspended in Saline solution using such illumination techniques, empty plastic shells, multiple lenses, and flipped or folded lenses have been detected after the inspection process, especially when the plastic shells are translucent.

A simple yet effective inspection system that combines the detection of presence or absence of lenses, flipped, folded and multiple lenses is desirable to the manufacturer to not only reduce cost but to streamline the quality control and subsequent segregation of non defective ophthalmic lenses. This process will enable manufacturers to ship good quality product to their customers.

Current methods generally use statistically sampled ophthalmic lenses which are manually inspected utilizing visible LED light for illumination and microscopes to detect flipped, multiple and floating lenses.

Such methods consume significant amount of time. Sampled inspection has also been to be found to allow defective product to pass through as they cannot guarantee 100% quality and highly prone to human errors and not effective, especially for mass production. It is generally understood that a well-designed automated inspection system is more consistent than a human inspection system because the automated system does not suffer from fatigue, distractions, or changes in subjective inspection criteria.

A single apparatus and method utilizing multiple wavelength illumination modules, that can produce accurate and reliable images of contact lenses suspended in saline solution contained in a frosted or translucent shell, to enable inspection of multiple features such as presence and absence of lenses, flipped lenses, multiple lenses and counting the number of lenses, is the objective of the present invention.

SUMMARY OF INVENTION

The apparatus and method of the present invention address at least some of the difficulties seen in the prior art.

An automatic ophthalmic lens inspection system in accordance with the present invention comprises a ophthalmic lens imaging system, which acquires a plurality of images of each lens being inspected, and a lens image analysis subsystem, which analyzes each image of the lens to determine whether the lens being inspected has one or more abnormalities. The automatic lens inspection system acquires one or more images of the object with one or more illumination configurations enabled. In one embodiment of the present invention, the lens inspection system inspects for presence of lenses in the plastic shell, flipped or wrongly oriented lenses, presence of multiple lenses and counting the number of lenses, folded lenses, or a combination of any of the preceding issues stated.

It is an object of the present invention to provide an apparatus and method for inspecting contact lenses suspended in saline solution to inspect for presence of contact lenses, counting the number of lenses, wrongly oriented lens, flipped or folded lens. The invention provided constitutes a high resolution camera and a lens to capture high resolution images of the contact lens which is illuminated with UV LED based illumination module, suitably mounted at the bottom of the lens holder, a second illumination module designed with Visible LEDs and suitably mounted on the top of the lens holder and an illumination controller to enable illumination of selected segments of LEDs in both the Illumination modules, as programmed in the software application.

It is further an object of the present invention to provide an apparatus and method to either utilize Ultraviolet (UV) wavelength (200-400 nm) LED based back light illumination, Visible wavelength LED based Top light illumination (400-700 nm) or a combination of both detection of presence of contact lenses.

It is further an object of the present invention to provide an apparatus that is integrated with a strobe controller that is capable of electronically triggering multiple illumination modules to emit light in short pulses at any given instance, synchronously to asynchronously.

It is yet another aspect of the present invention to provide an apparatus for use as an inline inspection module that is easily integrated into an automated inspection system.

Other features and objects of the present invention will become apparent from the detailed description of the preferred embodiment(s) as well as the drawing figures included herein below.

BRIEF DESCRIPTION OF DRAWINGS

It will be convenient to further describe the present invention with respect to the accompanying drawings that illustrate possible arrangements of the invention. Person skilled in the art will appreciate that other arrangements of the invention are possible, and consequently the particularity of the accompanying drawings is not to be understood as superseding the generality of the preceding description of the invention.

FIG. 3a illustrates an image of the ophthalmic lens holder with no lens captured with the system of prior art in FIG. 2, the area of inspection being B1a.

FIG. 4a illustrates an image of the ophthalmic lens holder with no lens captured with the system of prior art in FIG. 2, the area of inspection being B2a.

DETAILED DESCRIPTION OF THE PREFERRED EMBODIMENT(S)

Figure 1:
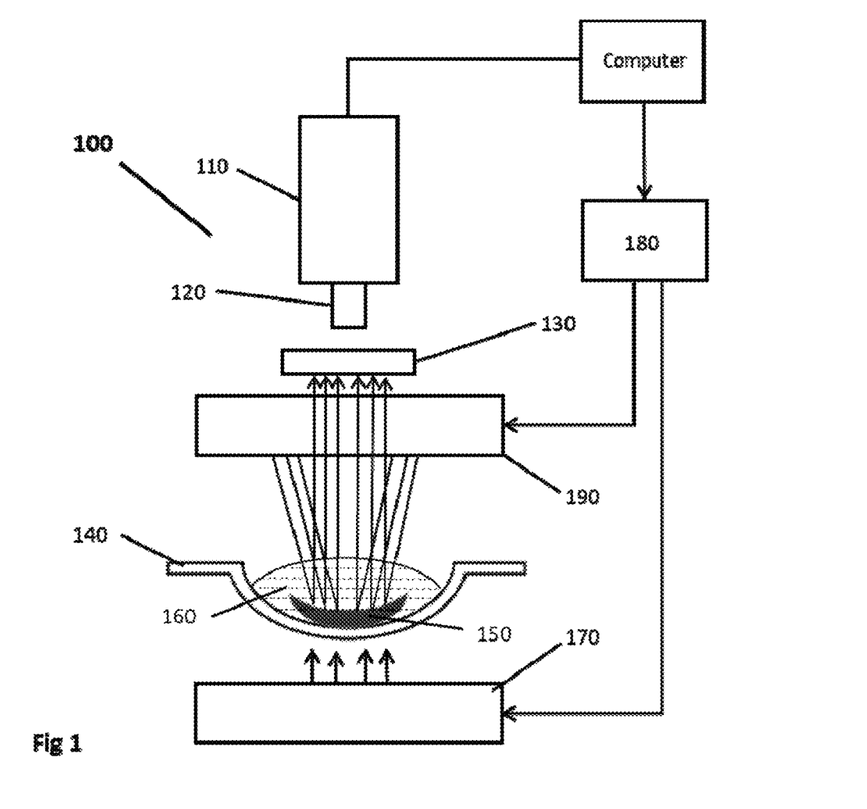
FIG. 1 is an illustration of the optical and illumination system according to the present invention.

Referring to FIG. 1, and in accordance with a constructed embodiment of the present invention, a system 100 and method for detecting presence or absence of ophthalmic lenses, presence of multiple lenses, folded lens and flipped lens that includes a camera 110 coupled to a lens 120 suitably integrated to a computer for analysis of the image captured by camera 110 as seen through the lens 120.

The system is integrated with two illumination modules 190 and 170. Illumination module 190 is designed with Visible LEDs whose wavelength may fall between 400 nm to 700 nm while the Module 170 is designed with Ultraviolet based LEDs whose wavelength may fall between 200 nm to 400 nm. Illumination Module 190 is positioned on top of the object 150 that is to be inspected and illumination module 170 is positioned below the object 150. The illumination module 170 emits Ultraviolet light synchronously with the operation of the camera 170 electronic shutter and a strobe controlling electronics module 180 and the illumination module 190 emits visible light synchronously with the operation of the camera 170 electronic shutter and the strobe controlling electronics module 180. The computer generates the strobe pulse for the illumination modules and the camera shutter for image capturing, based on the software program. The software program determines whether the strobes for both illumination modules, which may be simultaneous or at different times depending upon the inspection requirements.

Furthermore, in accordance with the present invention, a first optical filter 130 may be disposed in front of the lens 120 of the camera 110 thereof such that any light entering the lens 120 must first pass through the first optical filter 130. Thus the camera 110 obtains an image that includes the attenuated light either reflected or passing through the contact lens devoid of details from the spectrum of light rejected by the first optical filter 130. One of ordinary skill in the art will recognize that the placement of the first optical filter 130, whether in front of or behind the lens 120 of the camera 110, does not affect the operation of the present invention.

The backlit UV light source 170 may comprise a plurality of UV light emitting diodes (LEDs) emitting light at a wavelength sufficient to illuminate the contact lens 150 being inspected and suspended in a saline solution 160, all of which are held in a container 140.

The toplit Visible LED light source 190 may comprise a plurality of Visible light emitting diodes (LEDs) emitting light to illuminate the contact lens 150 being inspected and suspended in a saline solution 160 all of which are held in a container 140. The illumination module 190 is designed and constructed with LEDs combined to form segments such that selected segments may be utilised to illuminate the object under inspection. Segmentation of LEDs may be controlled by module 180 and may be different for different types of products, pre-determined and stored in recipes based on the product type which is configured during the setup of the inspection system.

In accordance with another embodiment of the present invention, the Visible LEDs based illumination module 190 may be triggered at different intensity in association with module 180 which is also capable of controlling intensity levels, to illuminate a particular type of lens material in order to enhance a specific feature of the object 150 that is being inspected. Accordingly, it is possible to utilize a different optical filter 130 to match the light spectrum based on Visible LED light source 190.

In accordance with another embodiment of the present invention, the UV LEDs based illumination module 170 may be triggered at the same intensity of module 190 or different intensity based on the feature to be enhanced in the object to be inspected. Accordingly, it is possible to either select a different optical filter 130 to match the light spectrum based on the UV LED source 170.

In accordance with another embodiment of the present invention, either the UV LEDs based illumination module 170 or the Visible LEDs based module 190 may be to turned OFF to enable a particular feature to be enhanced in the object to be inspected. In such circumstances, only one illumination module may be utilised for illumination of the product under inspection. Accordingly, it is possible to either select a different optical filter 130 to match the light spectrum based on the module utilised during image capture and inspection.

Figure 2:
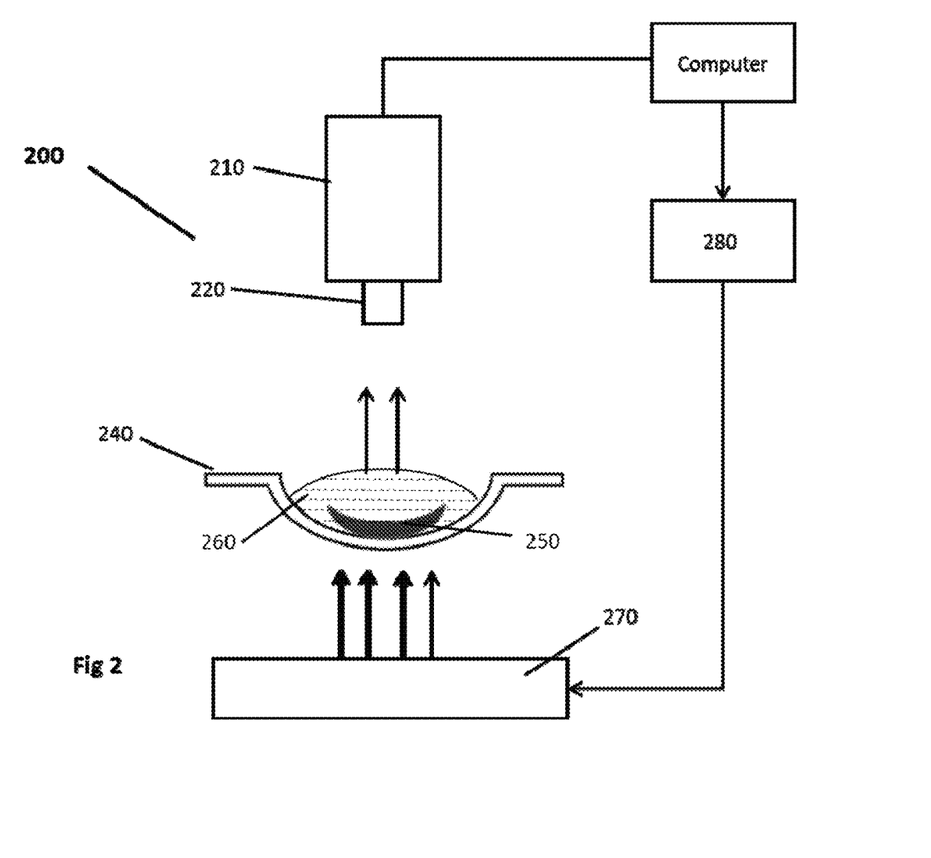
FIG. 2 is an illustration of the optical and illumination system of prior art.

The apparatus in FIG. 2 relates to conventional system of prior art commonly designed for inspecting defects in contact lenses. The apparatus 200 in FIG. 2 differs from the apparatus 100 of the present invention shown in FIG. 1, where in the Visible LED based illumination module 270 of FIG. 2 is positioned below the object of inspection 250. Referring to FIG. 2, a prior art system 200 includes a camera 210 coupled to a lens 220 suitably integrated to a computer for analysis of the image captured by camera 210 as seen through the lens 220.

The system is integrated with a single illumination module 270 designed with Visible LEDs whose wavelength may fall between 400 nm to 700 nm. Module 270 is positioned below the object 250. The illumination module 270 emits Visible light synchronously with the operation of the cameras and strobe controlling electronics module 280.

The foregoing detailed description of the embodiment(s) of the present invention shown in FIG. 1, is presented primarily for clarity of under standing and no unnecessary limitations are to be understood or implied therefrom. In a preferred embodiment of the present invention shown in FIG. 1, several examples are described below.

Figure 3:
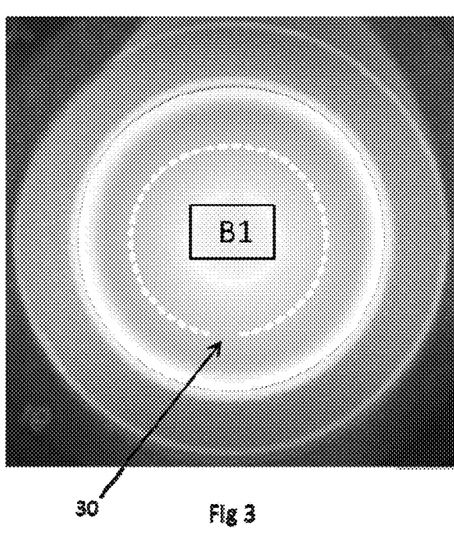
FIG. 3 illustrates an image of the ophthalmic lens holder with no lens captured with the system of the present invention in FIG. 1, the area of inspection being B1.

FIG. 3 shows an image of an empty lens holder captured using apparatus 100 illustrated in FIG. 1. In FIG. 3, the area encompassed by box B1 may be analyzed using an algorithm to arrive at an intensity value. Depending upon the pre-programmed inspection parameters which forms part of the recipe file that is configured for a particular product type, the computed intensity value is compared with the pre-programmed intensity value to determine if the value corresponds to presence of a lens or absence of a lens. Furthermore, the system of 100 of FIG. 1, captures the image of the lens holder with a few selected segments of illuminating LEDs in Top illumination module 190, turned OFF. The segments that are turned OFF are pre-programmed in the recipe file which are created during inspection setup for each product type. The process of image capture with the modified illumination configuration with the selected segments turn OFF, results in images with a break in the reflected pattern at position 30 in FIG. 3. The position of the break in the reflected pattern consisting of dashed lines which are approximately concentric to each other may vary depending upon the LED segments that are turned OFF. The significance of this phenomena will be explained in the foregoing description when explaining the defect inspection methodology.

Further analysis on the image may include detection of the edge of the lens suspended in the saline solution. However, it will be evident in the foregoing description that edge detection can be very difficult as the edge of the lens can become very faint depending upon the position of the lens. The edge detection method is therefore ambiguous resulting in unreliable accuracy and repeatability.

Figure 3A:
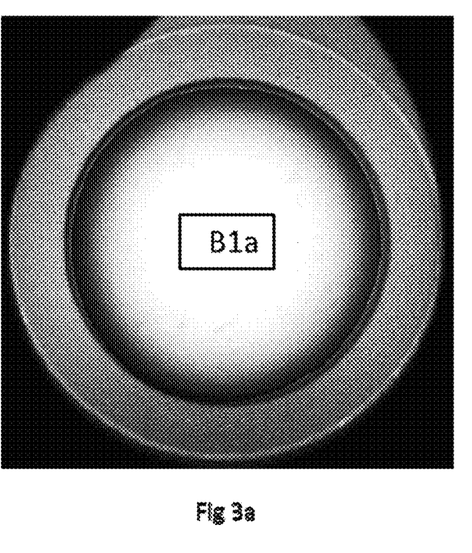

FIG. 3a shows an image of an empty lens holder captured using apparatus 200 illustrated in FIG. 2. There is little or no attenuation of light intensity nor is there any distinct pattern in the area encompassed by box B1a. It is important to note that Visible LED based illumination module 270 is utilised to illuminate the lens under inspection in the prior art system of 200 as illustrated in FIG. 2.

Figure 4:
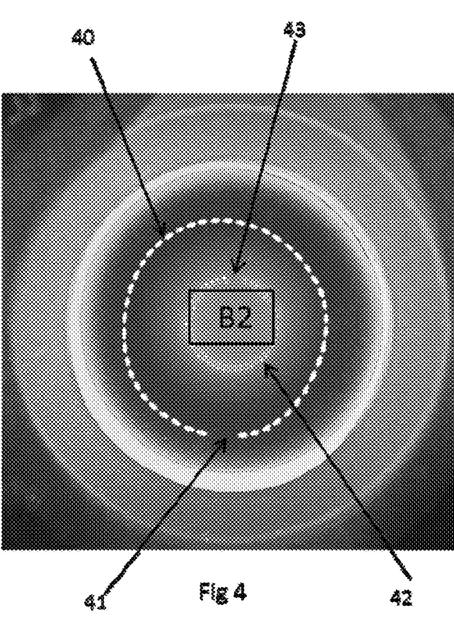
FIG. 4 illustrates an image of the ophthalmic lens holder containing a lens captured with the system of the present invention in FIG. 1, the area of inspection being B2.

FIG. 4 shows an image captured using apparatus 100 of a lens holder with a single ophthalmic lens suspended in saline solution. In FIG. 4, the area encompassed by box B2 shows two circular distinct patterns. The outer dashed line 40 is the reflection from the surface of the Saline solution 160 of FIG. 1 and the inner two dashed lines 42 are due to the reflection from the top and bottom surfaces of the contact lens 150 of FIG. 1 in the holder. It may be noted that there are two distinct patterns in the form of two non-continuous circles 40 and 42 with a break at 41 and 43 respectively and are at opposite sides of the image. This phenomena occurs due to the reflection from the Saline solution 160 which is convex shaped relative to the camera 110 of FIG. 1 and the reflection from the lens 150 which is concave shaped relative to the camera 110 of FIG. 1. This particular phenomena is especially useful when detecting floating lens issue, which will be discussed in the foregoing description.

The inconsistency of detecting the edge of the ophthalmic lens in the conventional method is eliminated by using the system of 100 wherein the two illumination modules 170 and 190 are utilised to achieve the image as illustrated in FIG. 4.

Figure 4A:
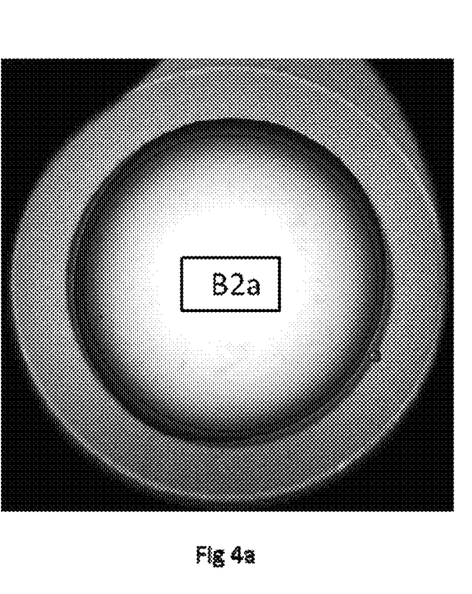

FIG. 4a shows an image of the holder containing a single lens captured using apparatus 200 of FIG. 2. In FIG. 4a which represents an image of the holder with a single lens, the area encompassed by box B2a shows no distinct change when compared with FIG. 3a which represents an image of the holder with no lens in the area encompassed by box B1a. The lack of any distinct pattern in the images captured by the system of 200 as shown in FIG. 3a and FIG. 4a, makes the system of 200 unreliable as the lens edge falls in the shadow area due to the limitations inherent in the system design.

Figure 5:
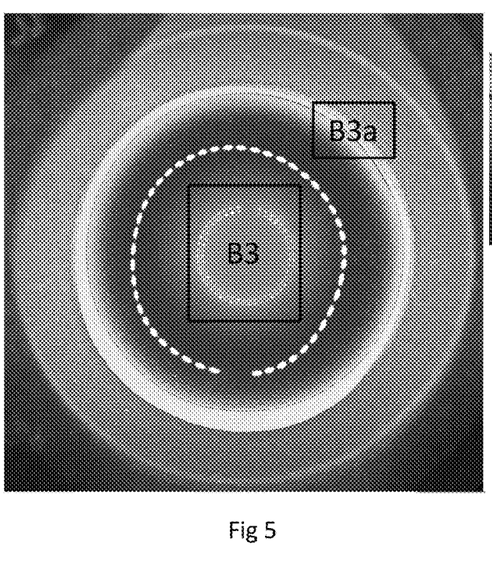
FIG. 5 illustrates an image of the ophthalmic lens holder with a correctly oriented lens, captured with the system of the present invention in FIG. 1.
Figure 6:
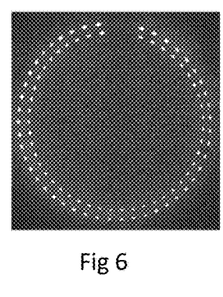
FIG. 6 is an enlarged image of area B3 in FIG. 5.
Figure 6A:
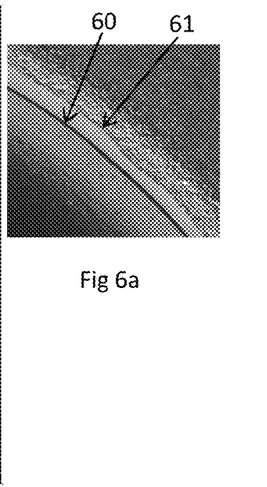
FIG. 6a is an enlarged image of area B3a in FIG. 5

FIG. 5 shows an image of the an ophthalmic lens captured using apparatus 100 as illustrated in FIG. 1, by synchronously triggering the illumination module 170 and 190 through the strobe controller 180 which is preconfigured for intensity, the active LED segments and the precise timing of the trigger by the software application. The parameters related to strobe controller 180 such as the timing of the trigger for the illumination modules, the intensity of the illumination & the selection of segments for illumination may be configured and stored as recipes depending upon the product type and the type of holder. The recipes may be subsequently downloaded at the time of setup to enable quick configuration of the inspection system for a particular product type. The area indicated by box B3 in FIG. 5 is shown enlarged in FIG. 6. As explained earlier the reflection phenomena due to the illumination of the lens by top light 190 results in a distinct pattern seen in FIG. 6 indicates that a lens is present in the holder. To detect if the lens is flipped or inverted, further analysis is done at the edge of the lens encompassed by the area B3a. An enlarged image of the area B3a of FIG. 5 is shown in FIG. 6a. In FIG. 6a, two clear edges 60 and 61 are evident. The line 60 represents the lens edge and the line 61 represents the edge of the Saline solution. The presence of a distinct line 60 along with the line 61 is analyzed and determined as a presence of lens that is correctly oriented.

Figure 7:
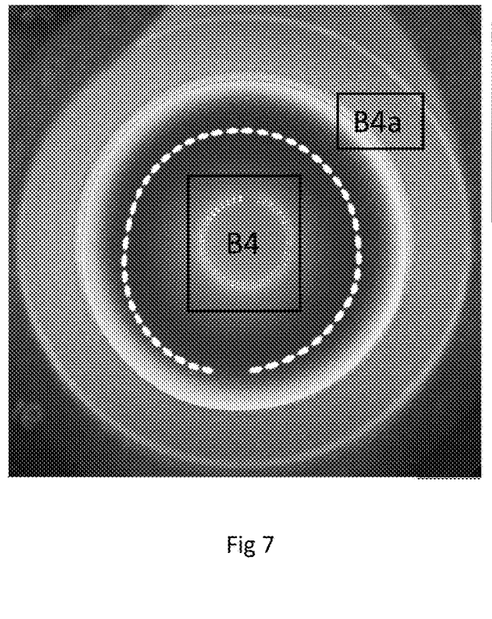
FIG. 7 illustrates image of the ophthalmic lens holder with a flipped lens, captured with the system of the present invention in FIG. 1.
Figure 8:
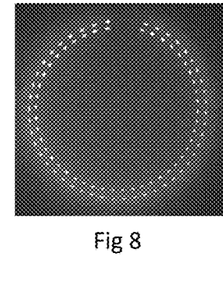
FIG. 8 is an enlarged image of area B4 in FIG. 7.
Figure 8A:
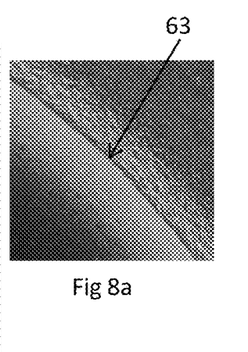
FIG. 8a is an enlarged image of area B4a in FIG. 7.
Figure 9:
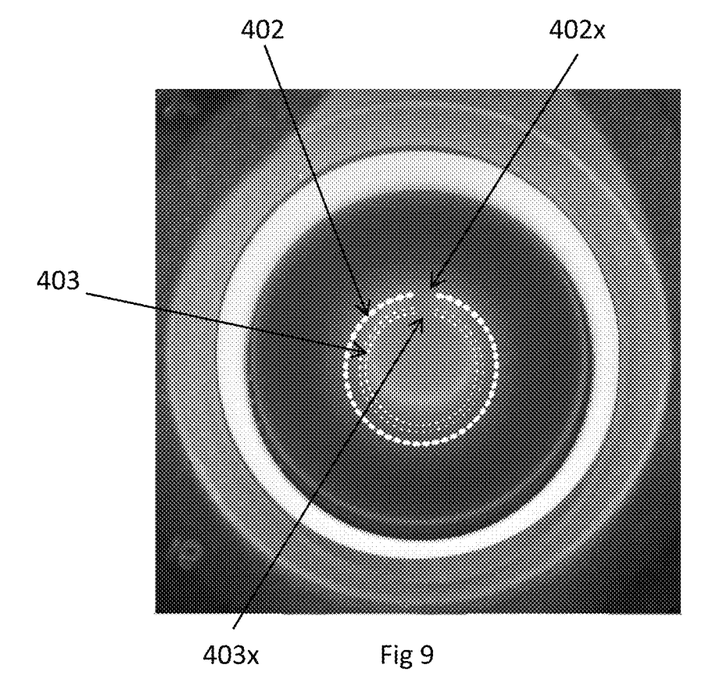
FIG. 9 illustrates an image of the ophthalmic lens holder with a floating lens, captured with the system of the present invention in FIG. 1.

FIG. 7 represents an image of the lens holder with a lens that is flipped or incorrectly oriented. The area indicated by box B4 in FIG. 7 is shown enlarged in FIG. 8. As explained earlier the distinct pattern seen in FIG. 8 shows that a lens is present in the holder. To detect if the lens is flipped or inverted, further analysis is done at the edge of the lens encompassed by the area B4a. An enlarged image of the area B4a of FIG. 7 is shown in FIG. 8a. In FIG. 8a, only one clear edge 63 is evident. The line 63 represents the edge of the Saline solution. The absence of another distinct line is determined as a lens that is incorrectly oriented or flipped lens as the distinct pattern in FIG. 8 already signifies the presence of a lens.

Figure 10:
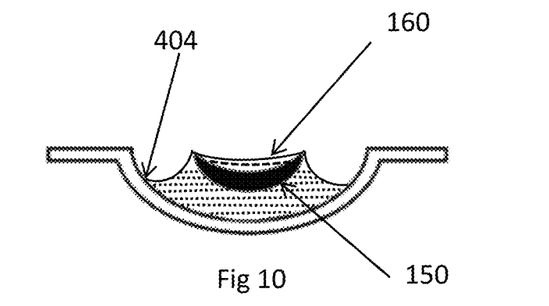
FIG. 10 is a partial cross-sectional view of the ophthalmic lens holder with a floating lens.

A typical floating lens issue is illustrated in FIG. 10 which shows a cross section view of a lens holder consisting of a lens 150 floating in the Saline Solution 160 with the edge of Saline solution represented by the position 404. A floating lens issue causes the Saline Solution to lose its convex shaped surface profile as seen in 160 and 260 of FIG. 1 and FIG. 2 respectively. This is due to the fact that the lens 150 in FIG. 10 is not resting at the bottom of the lens holder. In FIG. 10 the surface profile of the lens 150 and the saline solution 160 are similar resulting in the reflection pattern from both the surfaces to be similar as evident by the position of the breaks 402x and 403x in lines 402 and 403 respectively. This change in the pattern is classified as a floating lens issue.

Figure 11:
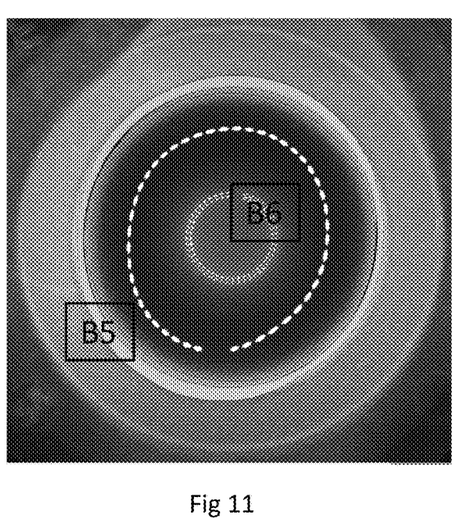
FIG. 11 illustrates an image of the ophthalmic lens holder with two lenses.
Figure 12:
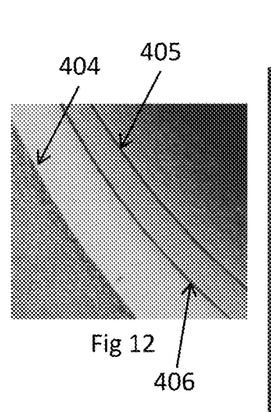
FIG. 12 is an enlarged image of area B5 in FIG. 11.
Figure 12A:
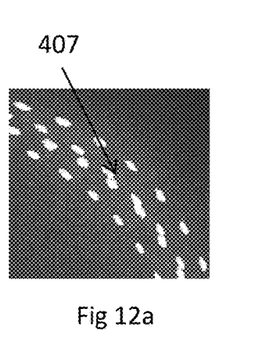
FIG. 12a is an enlarged image of area B6 in FIG. 11.

FIG. 11 represents an image of a lens holder consisting of two contact lens illuminated by Top light 190 and Back light illumination 170 of system 100 in FIG. 1. FIG. 12 is an enlarged image of box B5 in FIG. 11. In FIG. 12, two black lines are evident at 405 & 406 which represents the edges of the two lenses and 404 represents the edge of the Saline solution. The number black lines is directly proportional to number of lenses in the holder. Furthermore, the reflection from the top and bottom surfaces of the two lenses as shown in FIG. 12a which is an enlarged image of area encompassed by box B6 in FIG. 11, shows more than two circular non-continuous white lines 407. This pattern indicates the presence of more than one lens. Furthermore, the intensity of the area around the center of lens is lower when compared with a single lens image. The intensity of the illumination is proportionately lower for every increase in the number of lens. The image in FIG. 11 represents a clear case of multiple lenses and therefore rejected as a defect depending upon the parameters set by the software program.

Any pattern other than a non-continuous circle within the image around the center of the lens is analysed and classified under many categories such a tilted, shifted, folded and multiple lenses. The images captured by the system of 100 in FIG. 1 may utilise both Visible LED based Top light illumination 190 and UV LED based Back light illumination 170. Significant improvement is therefore achieved through the system of 100 in FIG. 1 to identify and segregate issues during the inspection process of Ophthalmic lenses.

Figure 13:
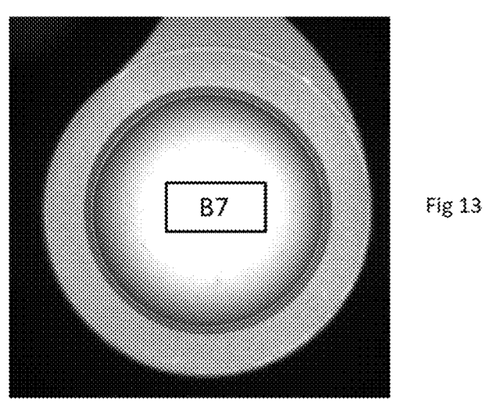
FIG. 13 illustrates an image of the ophthalmic lens holder with no lens, captured using only UV Backlight, the area of inspection being B7.
Figure 14:
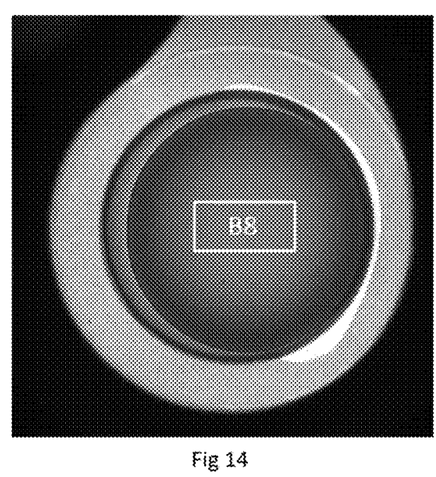
FIG. 14 illustrates an image of the ophthalmic lens holder with a single lens, captured using only UV Backlight, the area of inspection being B8.
Figure 15:
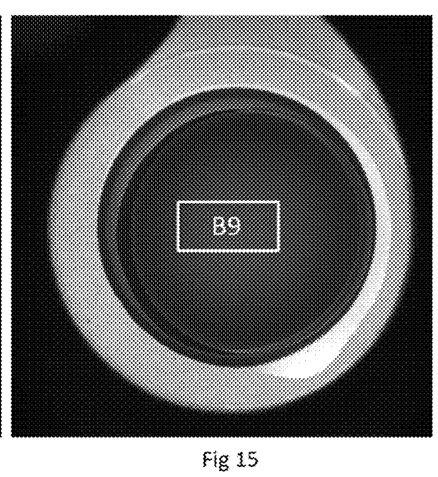
FIG. 15 illustrates an image of the ophthalmic lens holder with two lenses, captured using only UV Backlight, the area of inspection being B9.
Figure 16:
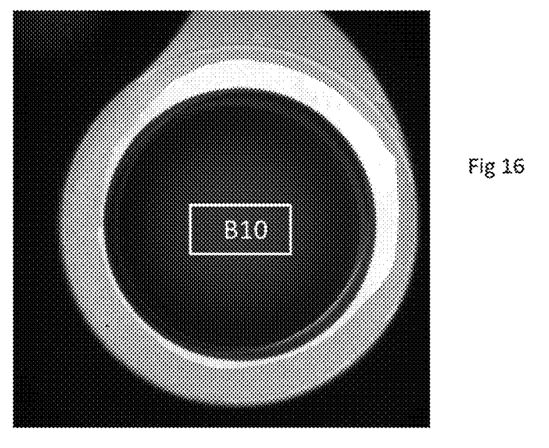
FIG. 16 illustrates an image of the ophthalmic lens holder with three lenses, captured using only UV Backlight, the area of inspection being B10.

Using a different embodiment of the present invention wherein only the UV based backlit illumination is used to illuminate the lens 150 in the system of 100 in FIG. 1, four images are illustrated. The images shown in FIGS. 13, 14, 15 & 16 represents contact lens image with the no lens, one lens, two lens and three lenses respectively to demonstrate the effect of attenuation and absorption. The grey scale values that are used to determine the absence and presence of lens is pre-determined and stored as parameters in the recipe files for different product types and holder types. During inspection setup, grey scale values related to single and multiple lenses are also determined and stored under their respective recipe files. As evident, the area B7 of the image in FIG. 13, is bright. When analyzed the intensity level or the grey scale level of area B7 in FIG. 13 is high indicating the absence of a lens in the holder. The average grey scale values in areas B8, B9 & B10 of images in FIGS. 14, 15 & 16 represents the presence of a single, double and triple lenses respectively. It is obvious to one skilled in the art that the optical area around the center of the lens decreases in intensity with each increase in the number of lens, clearly indicating the phenomena of increased light attenuation and absorption. The preconfigured intensity values which proportional to the number of lenses present in the holder are utilised by the software when inspecting the images, to consistently and accurately reject any lens holder containing no lens or more than one lens.

Modifications to the present invention in its various embodiment(s) will become obvious to those skilled in the art upon reading this disclosure and may be made without departing from scope of the invention encompassed by the claims appended hereto. In view of the above, it will be seen that the several objectives of the invention are achieved and other advantages are obtained. As many changes could be made in the above constructions and methods without departing from the scope of the invention, it is intended that all matter contained in the above description shall be interpreted as illustrative and not in a limiting sense.

The invention claimed is:

1. An apparatus for automatically inspecting lenses, comprising:
a transparent or translucent plastic holder for holding a contact lens immersed in saline solution;
a first illumination module arranged to be mounted on the top of the holder and a second illumination module arranged to be mounted at the bottom of the holder, said first and second illumination modules configured to illuminate the lens and the holder;
a strobe controller configured to trigger selected segments of the first illumination module;
a camera configured to capture an image of the lens and holder; and
a computer configured to accept the captured image, wherein the captured image is compared with inspection parameters, so as to identify a defect.

2. The apparatus of claim 1, wherein said first illumination module comprises a plurality of visible light emitting diodes.

3. The apparatus of claim 1, wherein said second illumination module comprises a plurality ultraviolet light emitting diodes.

4. The apparatus of claim 1, wherein said strobe controller is further configured to control an intensity of the first illumination module.

5. The apparatus of claim 2, wherein said strobe controller is further configured to strobe the first and second illumination modules from a synchronously state to an asynchronously state according to a predetermined parameter.

6. The apparatus of claim 2, wherein said strobe controller is further configured to enable or disable the selected segments of the first illumination module, wherein the selected segments are light emitting diode segments.

7. The apparatus of claim 2, wherein said predetermined parameter is determined by a software program.

8. A method for automatically inspecting at least a lens, comprising steps of:
disabling certain segments of a first illumination module and a second illumination module;
strobing a camera shutter and the first illumination module and the second illumination module synchronously to capture an image of a lens holder with the at least a lens immersed in saline solution, wherein the first illumination module is arranged to be mounted on top of the lens holder and the second illumination module is arranged to be mounted at a bottom of the lens holder;
analyzing the captured image to recognize a lens defect of the at least a lens;
recognizing the lens defect the defect by comparing the captured image with parameters preset in software; and
rejecting the at least a lens having the recognized lens defect.

9. A method for automatically inspecting a at least a lens, comprising steps of:
disabling certain segments of a first illumination module and a second illumination module;
strobing a camera shutter and the first illumination module and the second illumination module at different times to capture at least two images of a lens holder with the at least a lens immersed in saline solution, wherein the first illumination module is arranged to be mounted on top of the lens holder and the second illumination module is arranged to be mounted at a bottom of the lens holder;

analyzing the at least two captured images to recognize a lens defect of the at least a lens;

recognizing the lens defect by comparing the at least two captured images with parameters preset in software; and rejecting the at least a lens having the recognized lens defect.

10. The method of claim 8, further including a step of selectively enabling or disabling pre-programmed segments of light emitting diodes in the second illumination module.

11. The method of claim 9, further including a step of selectively disabling pre-programmed segments of light emitting diodes in the second illumination module.

12. The method of claim 8, further including a step of obtaining an image with the first and second illumination modules triggered synchronously with the camera shutter.

13. The method of claim 9, further including a step of obtaining two images with each of the first and second illumination modules triggered at two different intervals synchronously with the camera shutter.

14. The method of claim 8, wherein said second illumination module comprises a plurality of ultraviolet light emitting diodes.

15. The method of claim 9, wherein said second illumination module comprises a plurality of ultraviolet light emitting diodes.

16. The apparatus of claim 1, wherein the defect includes a plurality of black lines, a lens intensity pattern, a flipped lens pattern, a lens position pattern, a folded lens pattern and a multiple lens pattern.

17. The apparatus of claim 1, wherein the inspection parameters include a recipe file programmable by a user.

18. The apparatus of claim 5, wherein the predetermine parameter includes timing of the trigger of the first and second illumination modules and an intensity of the first and second illumination modules.

* * * * *